June 16, 1964 K. SCHLOTMANN 3,137,149
FLEXIBLE COUPLINGS
Original Filed May 24, 1961
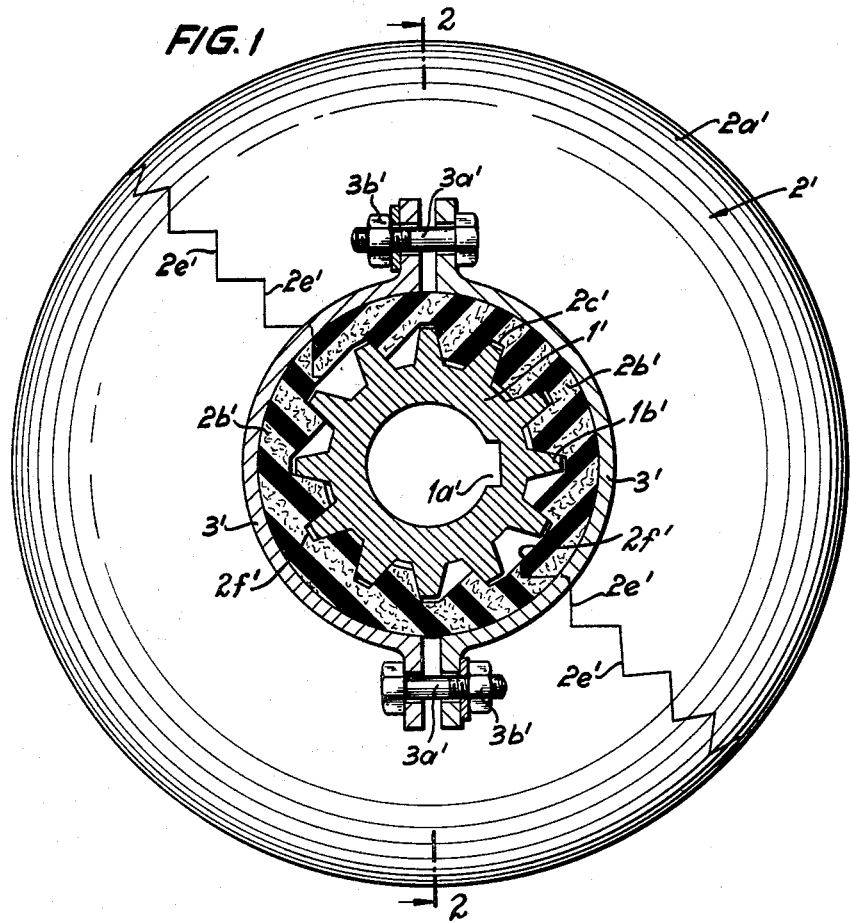
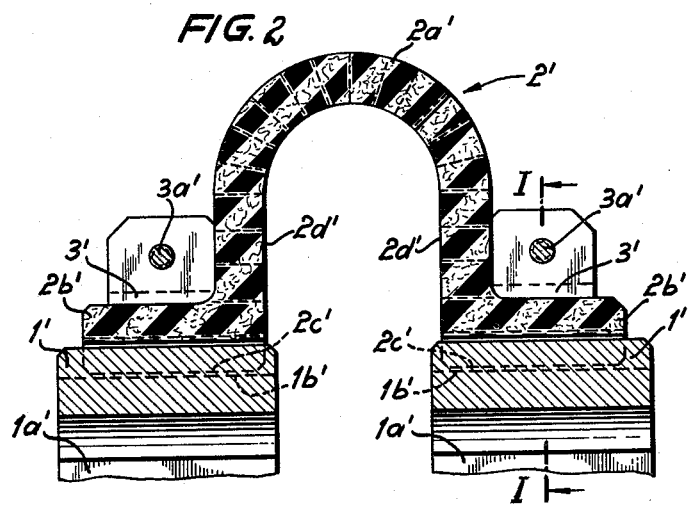
INVENTOR United States Patent Office 3,137,149
Patented June 16, 1964

1

3,137,149
FLEXIBLE COUPLINGS
Karl Schlotmann, Unna, Westphalia, Germany, assignor to Maschinenfabrik Stromag G.m.b.H., Unna, Westphalia, Germany
Original application May 24, 1961, Ser. No. 127,414, now Patent No. 3,095,714, dated July 2, 1963. Divided and this application May 2, 1963, Ser. No. 278,800
3 Claims. (Cl. 64—11)

This invention relates to flexible couplings for coupling coaxial shafts, and this application is a division of the co-pending patent application Ser. No. 127,414 filed May 24, 1961, now Patent No. 3,095,714 for Flexible Couplings.

It is a general object of this invention to provide improved couplings of the aforementioned character.

This invention reltaes more particularly to flexible couplings including a torque-transmitting member made largely, or substantially, of an elastomer, e.g. vulcanized rubber, and being substantially in the shape of a tire of an automotive vehicle. Flexible couplings of this character are described and claimed in United States Patent 2,648,958 to Karl Schlotmann, August 18, 1953, Flexible Coupling.

It is another object of this invention to provide flexible couplings having the advantages of the flexible couplings disclosed in the aforementioned patent but not being subject to the limitations of these prior art couplings.

One of the limitations of the aforementioned prior art couplings resides in the fact that it is relatively difficult to replace the elastic tire-shaped torque-transmitting member when the same is damaged, or worn out. Such a replacement requires an increase of the axial spacing of the two coaxial shafts which are intended to be coupled together to allow the torque-transmitting member to be inserted into the gap formed between the two shafts. Upon having placed the flexible torque-transmitting member into position the two shafts to be coupled must be restored to their initial positions and be re-aligned. These operations involve a considerable amount of work and require a considerable amount of skill.

It is, therefore, another object of this invention to provide flexible couplings having the same desirable operating characteristics as the flexible couplings according to the aforementioned United States Patent 2,648,958, but which include torque-transmitting members lending themselves more readily to installation than those of United States Patent 2,648,958.

The couplings disclosed and claimed in United States Patent 2,648,958 include flanges and clamping rings which increase their weight, the cost of the material that goes into the couplings, and the cost of machining the same.

It is, therefore, a further object of this invention to provide flexible couplings having substantially the same operating characteristics as those disclosed and claimed in United States Patent 2,648,958, but not being subject to the aforementioned limitations.

The foregoing and other general and special objects of this invention and advantages thereof will more clearly appear from the ensuing description of a preferred embodiment thereof illustrated in the accompanying drawings wherein:

FIG. 1 is a section taken along 1—1 of FIG. 2; and
FIG. 2 is a section along 2—2 of FIG. 1.

Referring now to the drawings, and more particularly to FIGS. 1 and 2 thereof, numerals 1' have been applied to indicate a pair of hub-members preferably of metal each adapted to be mounted upon, and keyed to, one of a pair of coaxial shafts (not shown). Reference character 1a' has been applied to indicate a groove inside of each of the hub-members 1' for receiving a key to key the particular hub-member 1' to a shaft on which the former is mounted. Both hub-members 1' are provided with such grooves. Reference numeral 2' has been applied to generally indicate a torque-transmitting member for transmitting torque from one of hub-members 1' to the other of hub-members 1', and consequently also from one of the shafts upon which one of the hub-members 1' is mounted and to which one of the hub-members 1' is keyed to the shaft upon which the other of the hub-members 1' is mounted and to which the other of the hub-members is keyed. Torque-transmitting member 2' is shaped in the fashion of a tire of an automotive vehicle and consists largely, or substantially, of an elastomer, e.g. vulcanized rubber, and may have inserts of canvas, or other re-inforcing inserts. Torque-transmitting member 2' includes a central substantially annular portion 2a' substantially U-shaped in cross-section. Portion 2a' has a pair of flanges or flange portions 2d' at right angles to the longitudinal axis of hub-members 1'. Torque-transmitting member 2' further includes a pair of integral hub-extensions 2b' projecting in opposite directions from the central annular portion 2a' thereof. Hub-extensions 2b' are substantially in the form of rubber sleeves, or sleeves made of a comparable elastomer, and each of them is mounted on one of the hub-members 1'. As mentioned above, the radial cross-section of the central portion 2a' of torque-transmitting member 2' is substantially in the shape of a U and the integral hub-extensions 2b' of member 2' projecting at right angles from the ends of the flange portions 2d' thereof are toroids formed by rotation of generatrices about the longitudinal axis of hub-member 1'. Torque-transmitting member 2' is diametrically subdivided into a pair of separate torque-transmitting units having abutting surfaces 2e', 2e' extending substantially diametrically. Surfaces 2e', 2e' are in the form of systems of teeth in cooperative relation each including male and female portions. By virtue of this engagement surfaces 2e', 2e' preclude relative axial displacement of the two-torque-transmitting units into which torque-transmitting member 2' is subdivided by surfaces 2e', 2e'. The coupling structure further comprises a pair of annular clamping members 3' each mounted on one of hub-extensions 2b' and each clamping one of the hub-extensions 2b' against one of hub-members 1'. In the embodiment of the invention shown in FIGS. 1 and 2 each of the clamping members 3' is made up of a pair of semi-circular parts which are joined together by a pair of screw-threaded studs 3a' each supporting a tightening nut 3b'. It will be apparent from FIG. 1 that the meshing gear surfaces 2e', 2e' extend all across the central annular portion 2a' of torque-transmitting member 2'.

The radially inner surfaces of 2f' of hub-extensions 2b' and the radially outer surfaces 1b' of hub-members 1' form systems of engaging and cooperating gears for transmitting torque from one of these parts to the other and for precluding relative rotational movement between parts 1' and 2'. It will be noted that the radial thickness of hub-extensions 2b' is less at the points where hub-extensions 2b' are subdivided by zig-zagging gear surfaces 2e', 2e' than at points which are angularly displaced 90 degrees from these points of subdivision. The unequal thickness of hub-extensions 2b' along the periphery thereof makes it relatively easy to bend the slotted portion of the hub-extensions radially outwardly for the purpose of mounting hub-extension 2b' on hub-members 1'. It provides also an empty space into which the rubber mass of hub-extensions 2b' may be compressed when clamping members 3' are being tightened.

If the torque to be transmitted from a driving shaft to a coaxial driven shaft is relatively small, the hub-members may be dispensed with. In this case the hub-extensions 2b' are being mounted directly on the shafts to be coupled, and must be provided with appropriate means for precluding rotational movements relative to the shafts upon which they are mounted.

In the embodiment of the invention shown the torque-transmitting member 2' is diametrically subdivided into two separate torque-transmitting units. If desired, the torque-transmitting members 2' may be radially subdivided in a similar fashion into a larger number of separate torque-transmitting units. Such a subdivision may be in order in the case of flexible couplings having relatively large sizes.

Relatively small flexible couplings do not require dual clamps as shown in FIGS. 1 and 2. Such couplings may be provided with lighter clamping means, e.g., ribbon-type clamps similar to the worm gear hose clamps used for attaching radiator hose in the automotive industries.

It will be apparent that the torque-transmitting units into which torque-transmitting member 2' is subdivided can be placed on, and removed from, a pair of coaxial shafts without disturbing the same. The progressive decrease of the depth of the gear teeth of hub-extensions 2b' down to zero at the point of hub-extensions 2b' where the latter are subdivided by surfaces 2e', 2e' and where there is a gap between two gear teeth of hub-members 1' into which no corresponding gear tooth of hub-extensions 2b' enters greatly facilitates removal and replacement of torque-transmitting member 2'.

Having disclosed two preferred embodiments of my invention, it is desired that the same be not limited to any particular structure disclosed. It will be obvious to any person skilled in the art that many modifications and changes may be made without departing from the broad spirit and scope of my invention. Therefore it is desired that the invention be interpreted as broadly as possible and that it be limited only by the prior state of the art.

I claim as my invention:

1. A flexible coupling comprising a pair of hub-members each adapted to be mounted upon and keyed to one of a pair of coaxial shafts and each having a radially outer gear shaped surface, a torque-transmitting member made substantially of an elastomer for transmitting torque from one of said pair of hub-members to the other of said pair of hub-members, said torque-transmitting member including a central substantially annular portion substantially U-shaped in cross-section and including flange portions arranged in planes at right angles to the axis of said pair of hub-members, said torque-transmitting member further including a pair of integral hub-extensions projecting in opposite directions from said flange portions of said central portion and each mounted on one of said pair of hub-members and each having a gear-shaped radially inner surface in meshing engagement with said radially outer gear-shaped surface of one of said pair of hub-members, said torque-transmitting member and said pair of hub-extensions thereof being subdivided by subdividing surfaces into a pair of separable complementary torque-transmitting units, said hub-extensions having a minimal radial thickness at the regions thereof immediately adjacent said subdividing surfaces and increasing in radial thickness with increasing angular spacing from said subdividing surfaces; and a pair of substantially annular clamping members each normally mounted on one of said pair of hub-extensions and each normally clamping one of said pair of hub-extensions against one of said pair of hub-members.

2. A flexible coupling comprising a pair of hub-members each adapted to be mounted upon and keyed to one of a pair of coaxial shafts and each having a radially outer gear shaped surface, a torque-transmitting member made substantially of an elastomer for transmitting torque from one of said pair of hub-members to the other of said pair of hub-members, said torque-transmitting member including a central substantially annular portion substantially U-shaped in cross-section and including flange portions arranged in planes at right angles to the axis of said pair of hub-members, said torque-transmitting member further including a pair of integral hub-extensions projecting in opposite directions from said flange portions of said central portion and each mounted on one of said pair of hub-members and each having a gear-shaped radially inner surface in meshing engagement with said radially outer gear-shaped surface of one of said pair of hub-members, said torque-transmitting member and said pair of hub-extensions thereof being subdivided by subdividing surfaces into a pair of separable complementary torque-transmitting units, the gear teeth of said gear-shaped radially inner surface of said pair of hub-extensions having a predetermined depth decreasing from regions of said pair of hub-extensions remote from said subdividing surfaces toward said subdividing surfaces; and a pair of substantially annular clamping members each normally mounted on one of said pair of hub-extensions and each normally clamping one of said pair of hub-extensions against one of said pair of hub-members.

3. A flexible coupling comprising a pair of hub-members each adapted to be mounted upon and keyed to one of a pair of coaxial shafts and each having a radially outer gear-shaped surface, a torque-transmitting member made substantially of an elastomer for transmitting torque from one of said pair of hub-members to the other of said pair of hub-members, said torque transmitting member including a central substantially annular portion substantially U-shaped in cross-section and including flange portions arranged in planes at right angles to the axis of said pair of hub-members, said torque-transmitting member further including a pair of integral hub-extensions projecting in opposite directions from said flange portions of said central portion and each mounted on one of said pair of hub-members and each having a gear-shaped radially inner surface in meshing engagement with said radially outer gear-shaped surface of one of said pair of hub-members, said torque-transmitting member and said pair of hub-extensions thereof being subdivided by subdividing surfaces into a pair of separable complementary torque-transmitting units, said pair of hub-extensions having gear-tooth-less portions immediately adjacent said subdividing surfaces and said pair of hub-extensions being provided with gear teeth of reduced depth immediately adjacent said gear-tooth-less portions thereof and said gear-shaped radially inner surface of said hub-extensions including gear teeth having a greater depth than said reduced depth; and a pair of substantially annular clamping members each normally mounted on one of said pair of hub-extensions and each normally clamping one of said pair of hub-extensions against one of said pair of hub-members.

References Cited in the file of this patent

UNITED STATES PATENTS

| | | |
|---|---|---|
| 2,648,958 | Schlotmann | Aug. 18, 1953 |
| 2,867,102 | Williams | Jan. 6, 1959 |
| 3,020,737 | Firth | Feb. 13, 1962 |